United States Patent
Kunimitsu et al.

(10) Patent No.: US 9,361,197 B2
(45) Date of Patent: Jun. 7, 2016

(54) PSEUDO-RANDOM ERROR INSERTION FOR NETWORK TESTING

(71) Applicant: Spirent Communications, Inc., Sunnyvale, CA (US)

(72) Inventors: Jocelyn Kunimitsu, Aiea, HI (US); John Morris, Simi Valley, CA (US)

(73) Assignee: SPIRENT COMMUNICATIONS, INC., Sunnyvale, CA (US)

( * ) Notice: Subject to any disclaimer, the term of this patent is extended or adjusted under 35 U.S.C. 154(b) by 44 days.

(21) Appl. No.: 14/529,055

(22) Filed: Oct. 30, 2014

(65) Prior Publication Data

US 2016/0124825 A1    May 5, 2016

(51) Int. Cl.
*G06F 11/00* (2006.01)
*G06F 11/263* (2006.01)
*G06F 11/07* (2006.01)

(52) U.S. Cl.
CPC ............ *G06F 11/263* (2013.01); *G06F 11/076* (2013.01); *G06F 11/079* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,233,073 | B1* | 5/2001 | Bowers | H04B 10/077 370/244 |
| 7,231,558 | B2* | 6/2007 | Gentieu | H04L 1/243 714/704 |
| 2003/0097624 | A1* | 5/2003 | Barton | H04J 3/14 714/704 |
| 2003/0099204 | A1* | 5/2003 | Subrahmanyan | H04J 3/076 370/252 |
| 2008/0159737 | A1* | 7/2008 | Noble | H04B 10/0775 398/16 |

* cited by examiner

*Primary Examiner* — Guerrier Merant
(74) *Attorney, Agent, or Firm* — Yiding Wu; Haynes Beffel & Wolfeld LLP

(57) ABSTRACT

A method is provided for generating errored test message words in network traffic used for testing. The method includes for each error cycle, select an error generator threshold, using a pseudo random sequence generator that advances with a new error cycle. The method includes for each test word generation cycle, determine whether to apply a bit error mask to a generated test word. An accumulator value is accumulated by an increment that takes into account at least a bit error rate and a bus width. The accumulator value is tested against the threshold. Upon reaching the threshold, a bit error mask is selected from a set of bit error masks, and applied to the generated test word. The threshold is then subtracted from the accumulator value, and a new error generator threshold is selected. The generated test word is output with or without a bit error as determined.

12 Claims, 3 Drawing Sheets

| B | # States |
|---|---|
| 1 | 0.625 |
| 2 | 1.250 |
| 3 | 1.875 |
| 4 | 2.500 |
| 5 | 3.125 |
| 6 | 3.750 |
| 7 | 4.375 |
| 8 | 5.000 |
| 9 | 5.625 |
| 10 | 6.250 |
| 11 | 6.875 |
| 12 | 7.500 |
| 13 | 8.125 |
| 14 | 8.750 |
| 15 | 9.375 |

| B | # States |
|---|---|
| 16 | 10.000 |
| 17 | 10.625 |
| 18 | 11.250 |
| 19 | 11.875 |
| 20 | 12.500 |
| 21 | 13.125 |
| 22 | 13.750 |
| 23 | 14.375 |
| 24 | 15.000 |
| 25 | 15.625 |
| 26 | 16.250 |
| 27 | 16.875 |
| 28 | 17.500 |
| 29 | 18.125 |
| 30 | 18.750 |
| 31 | 19.375 |
| Total | 310.000 |

Fig. 2

PSEUDO-RANDOM ERROR INSERTION FOR NETWORK TESTING

BACKGROUND

The technology disclosed relates to network equipment testing. In particular it relates to pseudo-random error insertion in network traffic for testing network equipment at very high speed.

Random transmission errors may occur in digital networks such that an occasional bit becomes corrupted in the network, resulting with the received value being different from the transmitted value. The average rate at which such errors occur in a network connection is called the Bit Error Rate (BER). BERs are expressed in exponential format; for example a BER of 3.4e-3 means that, on average, 3.4 bits out of each $10^3$ are corrupted. To test the behavior of network equipment in the presence of such random errors, test equipment simulates transmission errors by inserting random (or pseudo-random) errors, at a known and controlled average rate, into a transmitted bit-stream.

It is desirable to be able to simulate a wide range of BERs, typically from 1e-10 (one error in every $10^{10}$ bits on average) to 1e-1 (one error in every ten bits on average). Further, the distribution of errors should appear to be random. That is, when simulating a BER of (say) 1e-1, it is not acceptable for every tenth bit to be corrupted. Rather, the corruptions should appear random but with a medium term average rate tending towards one in ten.

At low network speeds, up to a few hundred Mbit/sec, the transmissions errors can be simulated with a simple pseudo-random number generator, iterating for each bit, and on each iteration comparing the pseudo-random value with a threshold value corresponding to that desired BER. However, at very high network speeds, beyond about one Gbit/sec, this is infeasible due to limitation of available logic speed in network test equipment.

In network test equipment for very high speeds the test traffic is generated many bits at a time, in parallel, typically 16, 32, 64, 128 bits at a time, corresponding to a bus width of 16, 32, 64, or 128 bits. For example, at 10 Gbit/second the transmit traffic may be generated, by a CPU or an FPGA, 64 bits at a time at a rate of $10^{10}/64=156.25$ MHz.

To simulate single bit transmission errors it is therefore desirable to create error insertion masks of the same size and to corrupt one or more bits by bitwise XORing 64 bits of generated traffic by this error insertion mask. (XOR means exclusive OR, a logic gate that outputs true when one of two inputs to the gate is true and the other input is false.) To do this requires the generation of 64 bit (in this example) error masks at 156.25 MHz such that the total number of error bits, over time, equals the required BER.

Therefore it is desirable to provide techniques for generating such error masks, with modest hardware computing resources (FPGA logic or CPU cycles), and at a very high speed at which the network equipment testing generates the network traffic for testing.

SUMMARY

A method is provided for generating errored test message words in network traffic used for testing. The method includes for each error cycle, using a pseudo random sequence generator that advances with a new error cycle, select an error generator threshold, taking into account at least a current element of the pseudo random sequence. The method includes for each test word generation cycle, determine whether to apply a bit error mask to a generated test word.

In one implementation, an accumulator value is accumulated by an increment that takes into account at least a bit error rate and a bus width. The accumulator value is tested against the error generator threshold. Upon reaching the error generator threshold, a bit error mask is selected from a set of bit error masks, and the selected bit error mask is applied to the generated test word. The error generator threshold is then subtracted from the accumulator value, and a new error generator threshold is selected using the pseudo random sequence generator. The generated test word is output with or without a bit error as determined by the selected bit error mask.

The increment can be an error probability multiplied by $(N+1)/2$, where the error probability takes into account at least the bit error rate and the bus width, and the N is a length of the pseudo random sequence. The set of bit error masks includes bit error masks including different numbers of error bit, and the proportion of mask including a certain number of error bit corresponding to the probability of a generated test word having the certain number of error bit based on the bit error rate.

Particular aspects of the technology disclosed are described in the claims, specification and drawings.

BRIEF DESCRIPTION OF THE DRAWINGS

FIG. 2 shows a list of number of states to generate at least one error bit for a particular error generator threshold.

DETAILED DESCRIPTION

The following detailed description is made with reference to the figures. Preferred implementations are described to illustrate the technology disclosed, not to limit its scope, which is defined by the claims. Those of ordinary skill in the art will recognize a variety of equivalent variations on the description that follows.

Mathematical Preamble

In a truly random situation the error mask for any given bus cycle may have zero, one, two, . . . BW error bits, where BW is the bus width. The bus width is the number of bits in a test word generated in a bus cycle and processed in parallel. In testing network traffic, errors may be injected into one or more bits in the test word, by inverting particular bit(s) at locations indicated by an error mask.

The probability P(n) of BW successive bits having n errors is given by:

$$P(n) = BER^n \times (1-BER)^{(BW-n)} \times BW! \div n! \div (BW-n)! \qquad (1)$$

where:
BER is the Bit Error Rate;
BW is the bus width, the number of transmit bits being processed in parallel;
! indicates the factorial operation.

For example, with bus width BW=64 and required bit error rate BER=1e-3, the first few values of P(n) are:

$$P(0) = 0.0010^0 \times 0.99964 \times 64!/0!/64! \sim = 0.93797$$

$$P(1) = 0.0011 \times 0.99963 \times 64!/1!/63! \sim = 0.06009$$

$$P(2)=0.0012\times0.99962\times64!/2!/62!\sim=0.00189$$

$$P(3)=0.0013\times0.99961\times64!/3!/61!\sim=0.00004$$

(etc)

So a fraction 0.93797 of the cycles of the 64 bit bus should have no errors inserted, a fraction 0.06009 should have a single error, a fraction 0.00189 should have two errors, etc.

Further, the fraction of cycles in which at least one bit should be errored, is given by:

$$Px=1-P(0) \quad (2)$$

Substituting 0 for n in equation (1) for P(n), equation (2) becomes:

$$Px=1-(1-\text{BER})^{(BW)} \quad (3)$$

Accordingly, equation (3) shows that the fraction of cycles in which at least one bit should be errored takes into account a bit error rate BER and a bus width BW.

Figure 1:
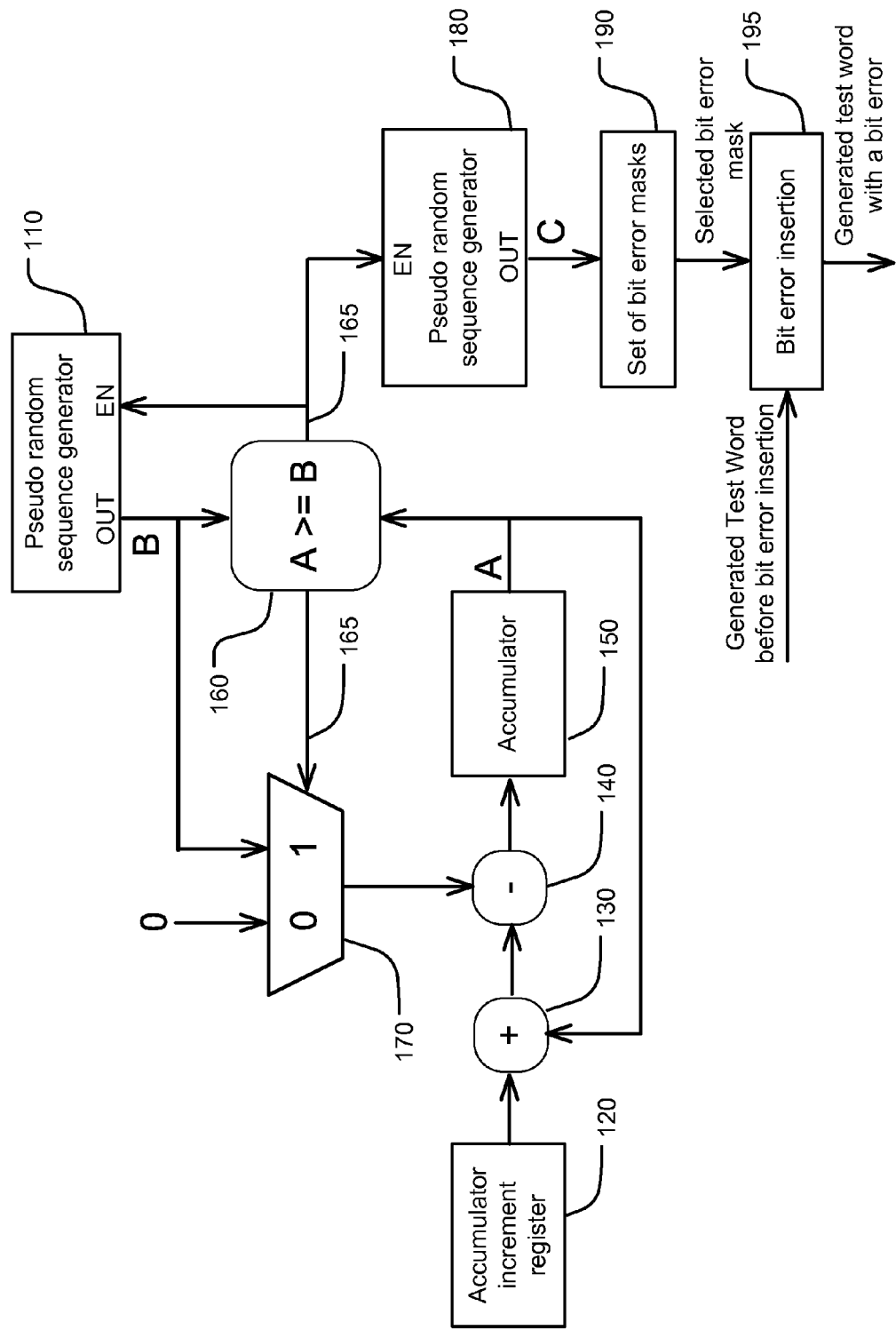
FIG. 1 is a block diagram of an example computing system for generating errored test message words in network traffic used for testing.

FIG. 1 is a block diagram of an example computing system for generating errored test message words in network traffic used for testing. The system 100 includes a first pseudo random sequence generator (e.g. 110) that can generate an error generator threshold (e.g. B), an accumulator increment register (e.g. 120) that can be initialized with and registers an increment, and an accumulator (e.g. 150) that can accumulate an accumulator value (e.g. A) by the increment registered by the accumulator increment register 120. An adder (e.g. 130) can add the increment from the accumulator increment register to a current accumulator value from the accumulator to produce a sum. A subtractor (e.g. 140) can subtract a current error generator threshold B (i.e. subtrahend) from the sum (i.e. minuend) and produce a result (i.e. difference) to the accumulator 150 which then updates the accumulator value with the result.

A comparator (e.g. 160) compares the accumulator value A to the error generator threshold B, and generates an output signal (e.g. 165) which is connected to a multiplexer (e.g. 170). If the output signal 165 indicates that A is greater than or equal to B, then the multiplexer 170 selects the current error generator threshold B as the subtrahend for the subtractor 140, otherwise the multiplexer 170 selects 0 (i.e. zero) as the subtrahend for the subtractor 140 so the sum from the adder 130 is passed to the accumulator 150.

In one implementation, the increment from the accumulator increment register 120, the output of the adder 130, the output of the subtractor 140, and the accumulator value A of the accumulator 150 can include an integer portion and a fractional portion. The adder 130 can add the increment to the integer portion and the fractional portion of the accumulator value A. The error generator threshold B can be an integer, the comparator 160 can compare B to the integer portion of A, and the multiplexer 170 can produce an integer.

The output signal 165 from the comparator 160 is also connected to an enable input EN on the first pseudo random sequence generator 110, and an enable input EN on a second pseudo random sequence generator (e.g. 180). If the output signal 165 indicates that A is greater than or equal to B, then the first pseudo random sequence generator 110 generates a new error generator threshold B, and causes the second pseudo random sequence generator 180 to generate a random mask selection number C between 1 and an integer M. Description about the first pseudo random sequence generator 110 is generally applicable to the second pseudo random sequence generator.

A set of bit error masks (e.g. 190) including M entries can be pre-computed and stored in a lookup table, such as in a RAM (random access memory) in an FPGA (field programmable gate array). A bit error mask can be selected from the set of bit error masks according to the random mask selection number C. One or more bit errors can then be inserted into a generated test word at bit locations indicated by the selected bit error mask to output a generated test word with a bit error (e.g. 195). The bit error insertion can be performed by bitwise XORing a generated test word by the selected error mask, where the generated test word and the selected error mask can have the same number of bits. XOR means exclusive OR, a logic function that outputs true when one of two inputs to the gate is true and the other input is false. For instance, one input to the XOR function can be a bit in the selected error mask and the other input to the XOR function can be a corresponding bit in the generated test word before bit error insertion.

For a bus cycle where the output signal 165 does not indicate that A is greater than or equal to B, a generated test word is output without any bit error insertion.

A method for generating errored test message words in network traffic used for testing is described in two stages. The first stage decides whether any bits in a generated test word having a bus width should have errors in a particular test word generation cycle. The second stage selects which bits within the bus width should be flipped to insert those errors.

Stage 1

From a required bit error rate BER and a known bus width BW, the probability of a cycle having at least one error bit is calculated (e.g. $Px=1-(1-\text{BER})^{(BW)}$). An error generator threshold ("B", FIG. 1) in the range 1 to N is pseudo-randomly generated, where N is an integer, such as 27 or 31. The bigger the value N is, the longer it is before a pseudo random sequence repeats itself. In one implementation, a sequence of values for the error generator threshold can be generated using a LFSR (i.e. linear feedback shift register). The LFSR can be used as a pseudo-random number generator which can have a relatively long cycle without repeating itself. The accumulator increment register 120 is loaded with the value $Px\times(N+1)/2$, i.e., the average random value multiplied by the probability of there being at least one error bit in a cycle. The accumulator increment register (e.g. 120, FIG. 1) is initialized to zero. Both the accumulator increment register and the accumulator (e.g. 150, FIG. 1) can contain fractional values (usually using fixed point in an FPGA implementation or floating point in a CPU implementation).

On each cycle, the increment value from the accumulator increment register is added to the accumulator, until the accumulator value reaches or exceeds "B", thus triggers an error generation state which cause three actions:

1. Subtract the current error generator threshold from the current accumulator value;
2. Generate a new pseudo-random value for the error generator threshold after the subtraction in action 1;
3. Execute Stage 2 (see below)

Since the accumulator is incremented by $Px\times(N+1)/2$ on each iteration or bus cycle, and the average pseudorandom value is $(N+1)/2$, then over time the average interval between trigger events is:

$$((N+1)/2)/(Px\times(N+1)/2)=1/Px.$$

Since the interval between triggers averages to 1/Px, the probability of the trigger firing—and hence causing a non-zero error mask to be generated in Stage 2 is Px, as required.

FIG. 2 illustrates an example for Stage 1. In the example, the target bit error rate BER is 10% (0.1), and a 5-bit pseudo-random number (1 to N=31) is generated for the error generator threshold B. The average of the integers in the range of 1 to 31 is 16, so the increment registered in the accumulator increment register (120, FIG. 1) is equal to 1.6 (=10%×16). If it increments 1.6 every state, and the first pseudo random sequence generator outputs an error generator threshold of 1, it takes 0.625 states to trigger an error generation state (1/1.6=0.625) and consequently to generate an error. If the error generator threshold is 2, it takes 1.25 states to trigger an error generation state (2/1.6=1.25). If the error generator threshold is 31, it takes 19.375 states to trigger an error generation state.

FIG. 2 shows a list of number of states to generate at least one error bit for a particular error generator threshold (e.g. "B") between 1 and N=31, and Px=1.6, where the number of states corresponds to "B" times the reciprocal of the accumulator increment (i.e. B/(Px×(N+1)/2)).

Totaling up the number of states for B=1 to 31 reflects how many states it takes for the pseudo-randomly generated values for the error generator threshold B to generate an error. In this example there are 31 pseudo-randomly generated values for the error generator threshold, so a total of 31 errors takes 310 states to generate. Dividing 310 by 31 shows that the average number of errored states is 1 out of 10. When an error is generated, the accumulator subtracts the error generator threshold B rather than clearing itself in order to keep track of how far off the required error rate a current average of bit error rate is such that bit errors inserted can gradually converge to the correct average of bit error rate.

Stage 2

Stage 2 takes effect in response to the trigger from Stage 1 (e.g. A>=B). A lookup table (e.g. 190, FIG. 1) is populated by pre-computed pseudo-random error masks. For instance, a lookup table can have M entries, where M is an integer. Each error mask has one, two, or more bits set. The number of error masks with each number of set bits is in proportion to the values of P(1), P(2), etc as described herein for the probability P(n) of bus width BW successive bits having n errors.

For example, in the above example (BER 1e-3, BW 64), the sum of P(1) through P(64) is approximately 0.06202. P(1) is 0.06009, so a fraction 0.06009/0.06202 of the table entries would be populated by error masks with one bit set. If the table has 512 entries, and rounding, there will be, in this example, 0.06009/0.06202*512=496 such entries.

Similarly, since P(2) is 0.00189, there will be 0.00189/0.06202*512=16 table entries with two bits set. Values of P(3) and higher are so small that they need not be represented in the table.

When the Stage 1 trigger occurs, a second pseudo-random sequence generator (e.g. 180, FIG. 1) is used to select a bit error mask from the table including a set of bit error masks (e.g. 190, FIG. 1), and this is the bit error mask (e.g. "C", FIG. 1) that will be applied in the current cycle.

The net effect of the current technology is that Stage 1 causes test words to have error masks applied pseudo-randomly at the correct distribution and frequency. Stage 2 causes the number of set bits in the error masks to match the distribution that would occur in a truly random system.

In one embodiment, one lookup table is used to store sets of bit error masks for different bit error rates. In alternative embodiment, multiple lookup tables can be used to store respective sets of bit error masks for different bit error rates. The one lookup table and/or a lookup table in the multiple lookup tables can be updated at intervals to vary the random error masks. For very low bit error rates the entries in the table will all have only a single bit set. Since the table entry itself is selected randomly, there is no need for these individual bits to be random: rather, entry 0 could have bit 0 set, entry 1 bit 1, and so on.

Figure 3:
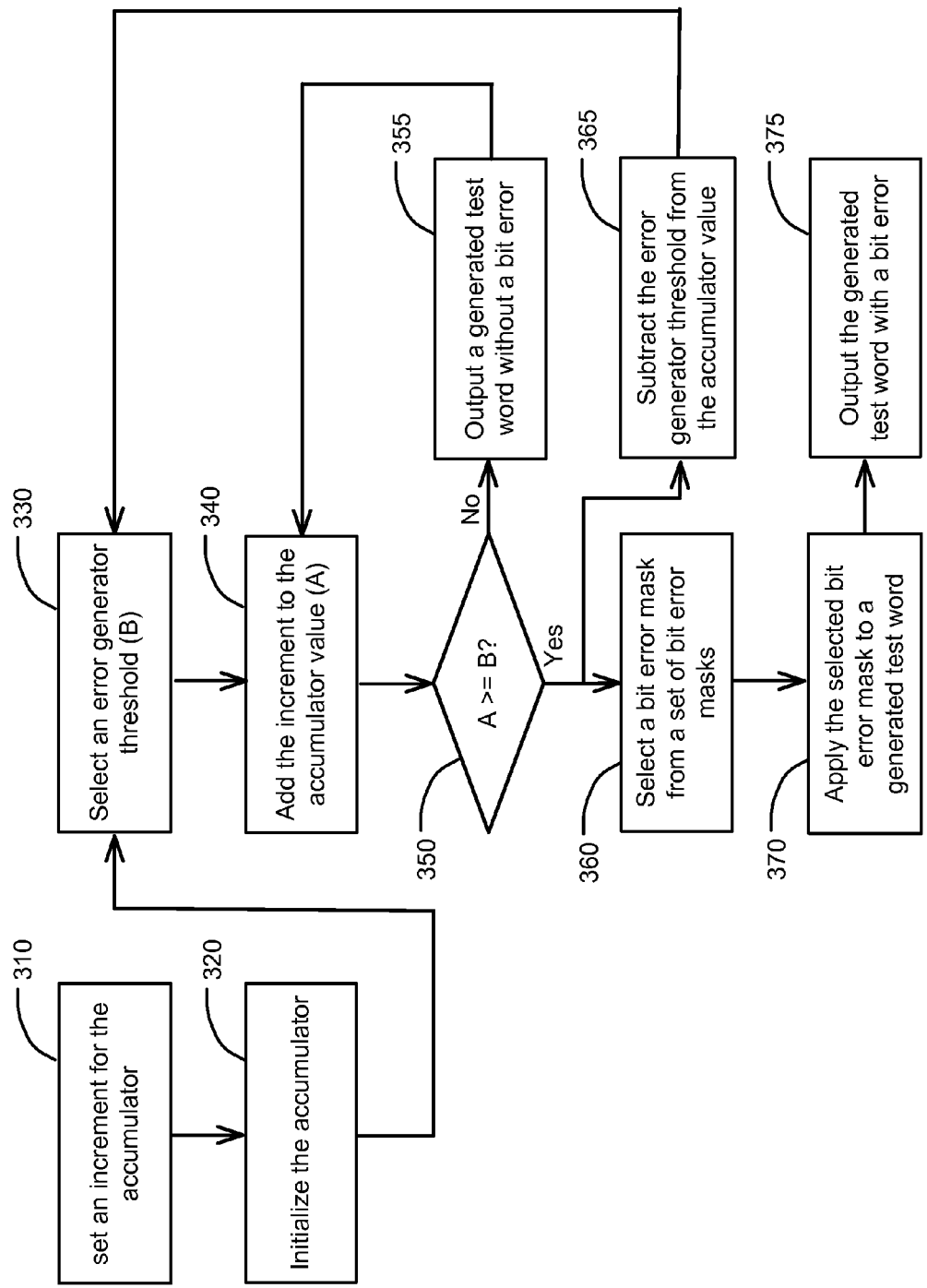
FIG. 3 illustrates a flow chart for generating errored test message words in network traffic used for testing.

FIG. 3 illustrates a flow chart for generating errored test message words in network traffic used for testing. At Step 310, an increment is set for the accumulator, such as in the accumulator increment register 120 (FIG. 1). The increment can be set as Px×(N+1)/2, where Px is the probability of bus width BW successive bits having at least one error bit, and N is the length of a pseudo random sequence generated for an error generator threshold. At Step 320, the accumulator is initialized, for example, to zero ("0"). At Step 330, a value is selected for an error generator threshold ("B") in a range between 1 and N. At Step 340, the increment is added to the value of the accumulator ("A"). At Step 350, The value of the accumulator is then tested against the error generator threshold. If A is not greater than B and not equal to B, then a generated test word is output without an inserted bit error, and a new test word generation cycle starts (Steps 355, 340).

If A is greater than or equal to B, then a bit error mask is selected from a set of bit error masks, the selected bit error mask is applied to the generated test word, and a generated test word is output with an inserted bit error as determined by the selected bit error mask (Steps 360, 370, 375). If A is greater than or equal to B, the current error generator threshold B is subtracted from the accumulator value A, and then a new value is selected for the error generator threshold for the next error cycle (Steps 365, 330).

The technology disclosed may be implemented in a computing system that performs pseudo-random error insertion method for very high speed network equipment testing. The computing system can includes one or more processors configured to perform operations implementing methods described herein and any of the features and optional implementations of the methods described herein. A processor as used herein can be an FPGA (Field Programmable Gate Array) such as manufactured by Xilinx, Inc, or a CPU (Central Processing Unit) such as manufactured by Intel Corporation.

While the technology disclosed is disclosed by reference to the implementations and examples detailed above, it is understood that these examples are intended in an illustrative rather than in a limiting sense. Computer-assisted processing is implicated in the described implementations. Accordingly, the technology disclosed may be implemented in methods for generating errored test message words in network traffic used for testing, systems including logic and resources to carry out generating errored test message words in network traffic used for testing, media impressed with logic to carry out generating errored test message words in network traffic used for testing, data streams impressed with logic to carry out generating errored test message words in network traffic used for testing, or computer-accessible services that carry out computer-assisted simulating real world conditions of generating errored test message words in network traffic used for testing. It is contemplated that modifications and combinations will readily occur to those skilled in the art, which modifications and combinations will be within the spirit of the technology disclosed and the scope of the following claims.

We claim as follows:

1. A method of generating errored test message words in network traffic used for testing, comprising:
   for each error cycle, using a pseudo random sequence generator that advances with a new error cycle, selecting an error generator threshold, taking into account at least a bit error rate, a bus width and a current element of the pseudo random sequence;
   for each test word generation cycle, determining whether to apply a bit error mask to a generated test word, including:
   accumulating an accumulator value by an increment that takes into account the bit error rate and the bus width;

testing the accumulator value against the error generator threshold; and upon reaching the error generator threshold:
selecting a bit error mask from a set of bit error masks;
applying the selected bit error mask to the generated test word;
subtracting the error generator threshold from the accumulator value;
using the pseudo random sequence generator, re-selecting the error generator threshold, taking into account at least the bit error rate, the bus width and a current element of the pseudo random sequence; and
outputting the generated test word with or without a bit error as determined by the selected bit error mask.

2. The method of claim 1, wherein the increment is an error probability multiplied by (N+1)/2, the error probability taking into account at least the bit error rate and the bus width, and the N being a length of the pseudo random sequence.

3. The method of claim 1, wherein the set of bit error masks includes bit error masks including different numbers of error bit, and
wherein the proportion of mask including a certain number of error bit corresponding to the probability of a generated test word having the certain number of error bit based on the bit error rate.

4. The method of claim 1, wherein the network traffic used for testing has a network speed exceeding 1 gigabit/sec.

5. A method including:
determining if a generated test word in network traffic for testing a high speed network is to include error bits based on a bit error rate and a bus width of the network traffic, including:
selecting an error generator threshold in a range between 1 and N;
incrementing an accumulator value for each generated test word by an increment until the accumulator value equals or exceeds the error generator threshold;
upon reaching the error generator threshold, selecting a bit error mask from a set of bit error masks to use in generating a current test word and reducing the accumulator value; and
outputting a generated test word with or without a bit error as determined by whether the selected bit error mask applies to the current test word,
wherein the increment is based on the range between 1 and N and the probability of a generated test word in the network traffic including one or more error bits.

6. A method of generating error bits in a pseudo random pattern in a generated test word in network traffic for testing a high speed network selected to include one or more error bits, the method including:
generating a random mask selection number in a range between 1 and M;
selecting a bit error mask corresponding to the random mask selection number, wherein the bit error mask is included in a set of bit error masks; and
generating a test word in the network traffic including one or more error bits using the selected bit error mask;
wherein the set of bit error masks includes bit error masks including different numbers of error bit, and
wherein the proportion of mask including a certain number of error bit corresponding to the probability of a generated test word having the certain number of error bit based on a selected bit error rate.

7. A computing system that performs generating errored test message words in network traffic used for testing, the computing system including one or more processors configured to perform operations comprising:

for each error cycle, using a pseudo random sequence generator that advances with a new error cycle, selecting an error generator threshold, taking into account at least a bit error rate, a bus width and a current element of the pseudo random sequence;

for each test word generation cycle, determining whether to apply a bit error mask to a generated test word, including:
accumulating an accumulator value by an increment that takes into account the bit error rate and the bus width;
testing the accumulator value against the error generator threshold; and
upon reaching the error generator threshold:
selecting a bit error mask from a set of bit error masks;
applying the selected bit error mask to the generated test word;
subtracting the error generator threshold from the accumulator value;
using the pseudo random sequence generator, re-selecting the error generator threshold, taking into account at least the bit error rate, the bus width and a current element of the pseudo random sequence; and
outputting the generated test word with or without a bit error as determined by the selected bit error mask.

8. The computing system of claim 7, wherein the increment is an error probability multiplied by (N+1)/2, the error probability taking into account at least the bit error rate and the bus width, and the N being a length of the pseudo random sequence.

9. The computing system of claim 7, wherein the set of bit error masks includes bit error masks including different numbers of error bit, and
wherein the proportion of mask including a certain number of error bit corresponding to the probability of a generated test word having the certain number of error bit based on the bit error rate.

10. The computing system of claim 7, wherein the network traffic used for testing has a network speed exceeding 1 gigabit/sec.

11. A computing system including one or more processors configured to perform operations including:
determining if a generated test word in network traffic for testing a high speed network is to include error bits based on a bit error rate and a bus width of the network traffic, including:
selecting an error generator threshold in a range between 1 and N;
incrementing an accumulator value for each generated test word by an increment until the accumulator value equals or exceeds the error generator threshold;
upon reaching the error generator threshold, selecting a bit error mask from a set of bit error masks to use in generating a current test word and reducing the accumulator value; and
outputting a generated test word with or without a bit error as determined by whether the selected bit error mask applies to the current test word,
wherein the increment is based on the range between 1 and N and the probability of a generated test word in the network traffic including one or more error bits.

12. A computing system that performs generating error bits in a pseudo random pattern in a generated test word in network traffic for testing a high speed network selected to include one or more error bits, the computing system including one or more processors configured to perform operations including:
- generating a random mask selection number in a range between 1 and M;
- selecting a bit error mask corresponding to the random mask selection number, wherein the bit error mask is included in a set of bit error masks; and
- generating a test word in the network traffic including one or more error bits using the selected bit error mask;
- wherein the set of bit error masks includes bit error masks including different numbers of error bit, and
- wherein the proportion of mask including a certain number of error bit corresponding to the probability of a generated test word having the certain number of error bit based on a selected bit error rate.

* * * * *